US007725691B2

(12) United States Patent
Stein et al.

(10) Patent No.: US 7,725,691 B2
(45) Date of Patent: May 25, 2010

(54) METHOD AND APPARATUS FOR ACCELERATING PROCESSING OF A NON-SEQUENTIAL INSTRUCTION STREAM ON A PROCESSOR WITH MULTIPLE COMPUTE UNITS

(75) Inventors: Yosef Stein, Sharon, MA (US); Joshua Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 503 days.

(21) Appl. No.: 11/045,888

(22) Filed: Jan. 28, 2005

(65) Prior Publication Data

US 2006/0174236 A1 Aug. 3, 2006

(51) Int. Cl.
G06F 7/38 (2006.01)
G06F 9/00 (2006.01)
G06F 9/44 (2006.01)
G06F 15/00 (2006.01)

(52) U.S. Cl. .................................................. 712/226
(58) Field of Classification Search ................. 712/220, 712/226
See application file for complete search history.

(56) References Cited

U.S. PATENT DOCUMENTS

| 4,435,758 | A | * | 3/1984 | Lorie et al. ..................... 712/22 |
| 4,783,738 | A | * | 11/1988 | Li et al. ........................ 712/21 |
| 4,792,894 | A | * | 12/1988 | Artz et al. .................... 711/220 |
| 4,992,933 | A | * | 2/1991 | Taylor ......................... 712/22 |
| 5,430,854 | A | * | 7/1995 | Sprague et al. ............. 712/236 |
| 5,542,074 | A | * | 7/1996 | Kim et al. ..................... 712/22 |
| 5,680,597 | A | * | 10/1997 | Kumar et al. ............... 712/226 |
| 6,820,188 | B2 | * | 11/2004 | Stansfield et al. ........... 712/206 |
| 7,191,317 | B1 | * | 3/2007 | Wilson ........................ 712/224 |
| 2005/0108720 | A1 | * | 5/2005 | Cervini ....................... 718/105 |

OTHER PUBLICATIONS

List et al.; Adaptive Deblocking Filter; Jul. 2003; IEEE Transactions on Circuits and Systems for Video Technology, vol. 13, No. 7; pp. 614-619.*
V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).
elixent Application Note *JPEG Codec* (Dec. 9, 2002) <http://www.elixent.com/assets/jpeg-coder.pdf> (elixent—Bristol, UK).
elixent, *Changing the Electronic Landscape* (2001) <http://www.elixent.com> (elixent—Bristol, UK).
PACT Informationstechnologie GmbH, *The XPP White Paper Release 2.1* (Mar. 27, 2002) <http://www.pactcorp.corn/xneu/download/xpp_white_paper.pdf> (PACT XPP—Santa Clara, CA).

* cited by examiner

*Primary Examiner*—Eddie P Chan
*Assistant Examiner*—Corey Faherty
(74) *Attorney, Agent, or Firm*—Goodwin Procter LLP

(57) ABSTRACT

Accelerating processing of a non-sequential instruction stream on a processor with multiple compute units by broadcasting to a plurality of compute units a generic instruction stream derived from a sequence of instructions; the generic instruction stream including an index section and a compute section; applying the index section to localized data stored in each compute unit to select one of a plurality of stored local parameter sets; and applying in each compute unit the selected set of parameters to the local data according to the compute section to produce each compute unit's localized solution to the generic instruction.

33 Claims, 13 Drawing Sheets

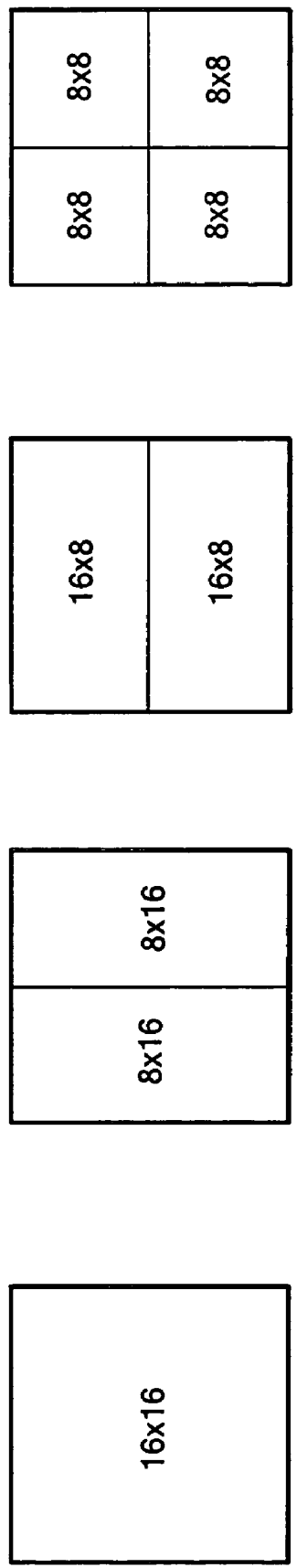
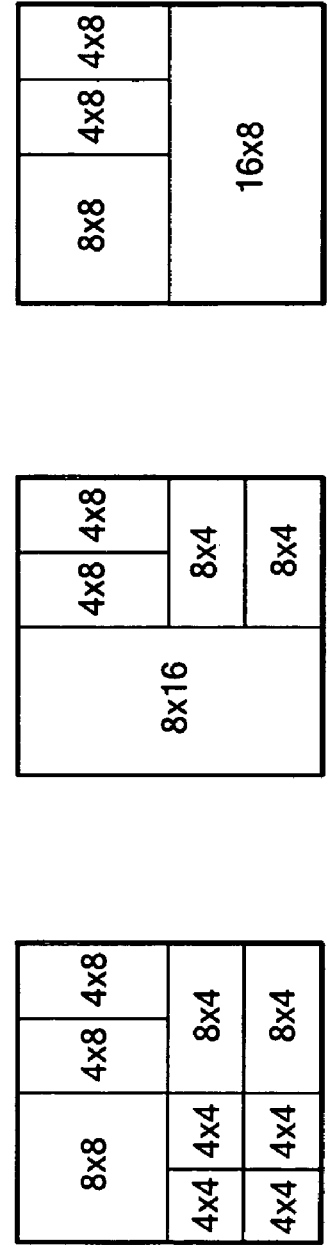
FIG. 3A  FIG. 3B  FIG. 3C  FIG. 3D  FIG. 3E  FIG. 3F  FIG. 3G

| Bs | ap | | aq |
|---|---|---|---|
| 1 | 0 | 102a | 0 |
| | 0 | 104a | 1 |
| | 1 | 106a | 0 |
| | 1 | 108a | 1 |
| 2 | 0 | 102b | 0 |
| | 0 | 104b | 1 |
| | 1 | 106b | 0 |
| | 1 | 108b | 1 |
| 3 | 0 | 102c | 0 |
| | 0 | 104c | 1 |
| | 1 | 106c | 0 |
| | 1 | 108c | 1 |
| 4 | 0 | 102d | 0 |
| | 0 | 104d | 1 |
| | 1 | 106d | 0 |
| | 1 | 108d | 1 |

} Pointer

*FIG. 9*

| Index$_A$ | Bs=1 | Bs=2 | Bs=3 |
|---|---|---|---|
| 26 | 1 | 1 | 1 |
| 27 | 1 | 1 | 2 |
| 28 | 1 | 1 | 2 |
| 29 | 1 | 1 | 2 |
| 30 | 1 | 1 | 2 |
| 31 | 1 | 2 | 3 |
| 32 | 1 | 2 | 3 |
| 33 | 2 | 2 | 3 |
| 34 | 2 | 2 | 4 |
| 35 | 2 | 3 | 4 |
| 36 | 2 | 3 | 4 |
| 37 | 3 | 3 | 5 |
| 38 | 3 | 4 | 6 |
| 39 | 3 | 4 | 6 |
| 40 | 4 | 5 | 7 |
| 41 | 4 | 5 | 8 |
| 42 | 4 | 6 | 9 |
| 43 | 5 | 7 | 10 |
| 44 | 6 | 8 | 11 |
| 45 | 6 | 8 | 13 |
| 46 | 7 | 10 | 14 |
| 47 | 8 | 11 | 16 |
| 48 | 9 | 12 | 18 |
| 49 | 10 | 13 | 20 |
| 50 | 11 | 15 | 23 |
| 51 | 13 | 17 | 25 |

*FIG. 10*

METHOD AND APPARATUS FOR ACCELERATING PROCESSING OF A NON-SEQUENTIAL INSTRUCTION STREAM ON A PROCESSOR WITH MULTIPLE COMPUTE UNITS

FIELD OF THE INVENTION

This invention relates to accelerating processing of a non-sequential instruction stream on a processor with multiple compute units.

BACKGROUND OF THE INVENTION

Video compression involves encoding/decoding of pixel information in 16×16 pixels macroblocks. The new emerging standards like (MPEG4, H.264, and Windows Media) provide a flexible tiling structure in a macroblock. It allows the use of 16×16, 16×8, 8×16, 8×8, 8×4, 4×8, and 4×4 sub-macroblock sizes. A filter (de-blocking filter) is applied to every decoded macroblock edge to reduce blocking distortion resulting from the prediction and residual difference coding stages of the decoding process. The filter is applied on both 4×4 block and 16×16 macroblock boundaries, in which three pixels on either side of the boundary may be updated using a five-tap filter. The filter coefficients or "strength" are governed by a content adaptive non-linear filtering scheme. This is done in a number of ways. Windows Media Video decoder (wmv) uses one protocol involving the boundary strength across block boundaries. H.264 or MPEG-4 part 10 uses pixel gradient across block boundaries.

In H.264 the de-blocking filter is applied after the inverse transform in the encoder (before reconstructing and storing the macroblock for future predictions) and in the decoder (before reconstructing and displaying the macroblock). The filter has two benefits: block edges are smoothed, improving the appearance of decoded images (particularly at higher compression ratios). And in the encoder the filtered macroblock is used for motion-compensated prediction of further frames, resulting in a smaller residual after prediction.

Three levels of adaptive filtering (slice, edge, and sample) are applied to vertical or horizontal edges of 4×4 sub-macroblocks in a macroblock, in the following order vertical first and then horizontal. Each filtering operation affects up to three pixels on either side of the boundary. In 4×4 pixel sub-macroblocks there are 4 pixels on either side of a vertical or horizontal boundary in adjacent blocks p and q (p0,p1,p2, p3 and q0,q1,q2,q3). Depending on the coding modes of neighboring blocks and the gradient of image samples across the boundary, several outcomes are possible, ranging from (a) no pixels are filtered to (b) p0, p1, p2, q0, q1, q2 are filtered to produce output pixels P0, P1, P2, Q0, Q1 and Q2.

The choice of filtering outcome depends on the boundary block strength (edge level) parameter and on the gradient of image samples across the boundary (sample level). The boundary strength parameter Bs is chosen according to the following rules:

| | | |
|---|---|---|
| p or q is (intra coded and boundary is a macroblock boundary) | Bs = 4 (strongest filtering) | $P_0, P_1, P_2,$ $Q_0, Q_1, Q_2$ |
| p or q is intra coded and boundary is not a macroblock boundary | Bs = 3 | $P_0, P_1,$ $Q_0, Q_1$ |
| neither p or q is intra coded; | Bs = 2 | $P_0, P_1,$ $Q_0, Q_1$ |
| neither p or q is intra coded; neither p or q contain coded coefficients; p and q have different reference frames or a different number of reference frames or different motion vector values | Bs = 1 | $P_0, P_1,$ $Q_0, Q_1$ |
| neither p or q is intra coded; neither p or q contain coded coefficients; p and q have same reference frame and identical motion vectors | Bs = 0 (no filtering) | |

The filter is "stronger" at places where there is likely to be significant blocking distortion, such as the boundary of an intra coded macroblock or a boundary between blocks that contain coded coefficients.

The filter sample level decision (ap==[1,0] for the left side of the filter, and aq==[1,0] for the right side of the filter) depends on the pixel gradient across block boundaries. The purpose of that decision is to "switch off" the filter when there is a significant change (gradient) across the block boundary or to filter very strongly when there is a very small change (gradient) across the block boundary which is likely to be due to image blocking effect. For example, if the pixel gradient across an edge is below a certain slice threshold (ap/aq=1) then a five tap filter (a strong filter) is applied to filter P0, if not (ap/aq=0) then a three tap filter (a weak filter) is applied. In slow single compute unit processors the selection between which of the filters to apply is done using If/else, jump instructions. The sequencer must jump over the second filter instruction stream if the first one is selected or jump over the first one if the second one is selected. These jump (If/else) instructions are acceptable in slower single compute unit processors but not in fast (deep pipelined) single compute unit processors and/or multi-compute unit processors such as a single instruction multiple data (SIMD) processors.

Since an SIMD processor can solve similar problems in parallel on different sets of local data it can be characterized as n times faster than a single compute unit processor where n is the number of compute units in the SIMD. However, this benefit only is available for sequential types of problems such as FIR, FFT, and DTC, IDCT, etc. The need for SIMD type processing for non-sequential instruction streams is increasing as image size increases.

However, in such multiple compute unit processors where a single sequencer broadcasts a single instruction stream which drives each of the compute units on different local data sets, e.g. the pixel gradient at block boundaries, the conduct of each compute unit may be different, jump/not jump; and to where—depending upon the effect of the common instruction on the individualized local data, and the sequencer cannot take a decision if to jump/not jump that satisfies all the compute units. Therefore, the high speed and efficiency of SIMD processors has not been applied to the family of non-sequential instructions e.g. conditional (if/else, jump) type of problems.

BRIEF SUMMARY OF THE INVENTION

It is therefore an object of this invention to provide a multiple compute unit processor and method for accelerating processing of a non-sequential instruction stream.

It is a further object of this invention to provide such a multiple compute unit processor and method which increases computing speed by nearly n times where n is the number of compute units.

It is a further object of this invention to provide such a multiple compute unit processor and method which avoids jumps which interrupt the operation of deep pipeline processors.

It is a further object of this invention to provide such a multiple compute unit processor and method which can parallel process different filter strengths Bs=0 to Bs=4 on different compute units and further increase computing speed.

The invention results from the realization that a faster more efficient method of processing a non-sequential instruction on a processor with multiple compute units, such as but not limited to a single instruction multiple data (SIMD) processor, can be effected by deriving from a sequence of instructions a generic instruction having an index section and compute section and broadcasting that generic instruction to the multiple compute units, where the index section is applied to localized data stored in each compute unit to select one of a plurality of stored local parameter sets and applying in each compute unit the selected parameters to the local data according to the compute section to produce each compute unit's localized solution to the generic instruction; and from the further realization that each set of parameters may include nulling values to selectively remove unnecessary terms of the generic instruction to adapt the generic instruction to the local solution and that the generic instruction can be further generalized to permit, in for example, loop filter or de-blocking video filters, parallel processing of multiple pixels and in multiple filter strengths.

The subject invention, however, in other embodiments, need not achieve all these objectives and the claims hereof should not be limited to structures or methods capable of achieving these objectives.

This invention features a method of accelerating processing of a non-sequential instruction stream on a processor with multiple compute units including broadcasting to a plurality of compute units a generic instruction stream derived from a sequence of instructions. The generic instruction stream includes an index section and a compute section. The index section is applied to localized data stored in each compute unit to select one of a plurality of stored local parameter sets. In each compute unit the selected set of parameters is applied to the local data according to the compute section to produce each compute unit's localized solution to the generic instruction.

In a preferred embodiment each set of parameters may include nulling values to selectively remove unnecessary terms of the generic instruction to adapt the generic instruction to the local solution. Each compute unit may include at least a multiplier and an accumulator, each compute unit may include a local storage; each local storage may include a data storage and a parameter storage. The parameters may include filter coefficients. The local data may include image pixels and the index section may be a function of the pixel gradient across block boundaries. The local data may include image pixels and the index section may be a function of boundary strength or cross-block boundaries. The compute section may include clipping operations. Each set of parameters may include nulling values to selectively null clipping operations of the associated compute unit to adapt the generic instruction stream compute section to the local solution. The processor with multiple compute units may be a single instruction multiple data SIMD processor. It may be a loop filter, it may be a video de-block filter. The local data may include image pixels and the index section may be a linear function of the pixel gradient or boundary strength across block boundaries and the boundary strength parameter. The parameter sets may include at least two filter coefficient sets. The multiple compute units may be grouped into clusters in which all compute units are solving the same problem for the same strength parameter and different clusters solve for different strength parameters. Each generic instruction stream-compute section may include the generic solution for all compute units in all clusters to keep all compute units in step. Each generic instruction stream-compute section may include the generic solution of all different strength parameters for all compute units in all clusters to keep all compute units in step. Each generic instruction stream-compute section may include the generic non-linear solution of all different strength parameters for all compute units in all clusters to keep all compute units in step. Each set of parameters may include nulling values to selectively null clipping operations of the associated compute unit to adapt the non-linear generic solution to a linear solution.

This invention also features a method of accelerating processing of a non-sequential instruction stream on a processor with multiple compute units including generating a generic instruction stream from a sequence of instructions. The generic instruction stream includes an index section and a compute section. The generic instruction with index and compute sections is broadcast to a plurality of compute units. The index section is applied to localized data stored in each compute unit to select one of a plurality of stored local parameter sets. In each compute unit the selected set of parameters is applied to the local data according to the compute section to produce each compute unit's localized solution to the generic instruction.

The invention also features a processor with multiple compute units for accelerating processing of a non-sequential instruction stream including a sequencing circuit for deriving from a sequence of instructions a generic instruction stream including an index section and compute section. There are a plurality of compute units each including a local data storage and a local parameter set storage. Each compute unit applies the index section to the localized data to select one of the local parameter sets and applies a selected set of parameters to the local data to produce each compute unit's localized solution to the generic instruction stream.

In a preferred embodiment each compute unit may include a multiplier and an accumulator. The set of parameters may include nulling values to selectively remove unnecessary terms of the generic instruction to adapt the generic instruction to the local solution. The sets of parameters may include filter coefficients. The local data may include image pixels and the index section may be a function of the pixel gradient across block boundaries or it may be a function of the boundary stream across block boundaries. The compute section may include clipping operation instructions. Each set of parameters may include nulling values to selectively null clipping operations of the associated compute unit to adapt the generic instruction stream compute solution to the local section to the local solution. The processor may include a single instruction multiple data (SIMD) processor or loop filter or video de-blocking filter.

BRIEF DESCRIPTION OF THE DRAWINGS

Other objects, features and advantages will occur to those skilled in the art from the following description of a preferred embodiment and the accompanying drawings, in which:

FIG. 3A-G are examples of sub-macroblocks tiling structure in a macroblock;

FIG. 9 is a table illustrating the sets of parameter required for all values of ap and aq for all filter values Bs=1-4;

FIG. 10 is a table of $C_0$ values for Bs=1-3;

DISCLOSURE OF THE PREFERRED EMBODIMENT

Figure 1:
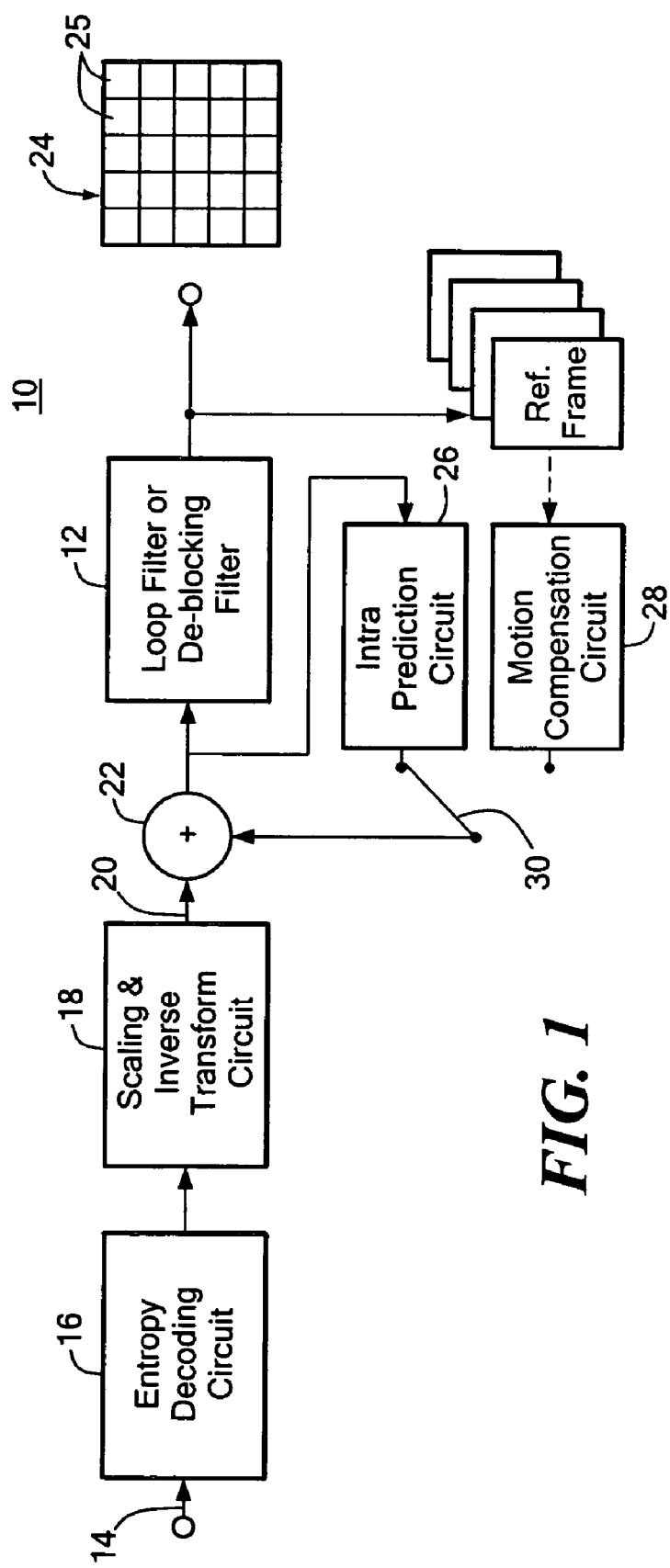
FIG. 1 is a block diagram of a video decoder with a loop filter employing this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The preferred embodiment disclosed herein is described in the environment of a video system wherein an image is compressed and encoded in 16×16 pixel macroblocks and then streamed to a decoder. The invention resides in a loop filter or de-blocking filter which is used in both the encoder and the decoder of such systems.

There is shown in FIG. 1 a video decoder 10 in a receiver of such a system which uses a loop filter or de-blocking filter 12. In operation the compressed bit stream representing the image made of 16×16 pixel macroblocks is delivered to the input 14 of entropy decoding circuit 16. The decoded coefficients are submitted to scaling and inverse transform circuit 18 whose outputs are the residual macroblock data for the current macroblock. This is supplied on line 20 to summing circuit 22. The output of summing circuit 22 comprising the reconstructed macroblock is submitted to loop filter or de-blocking filter 12. The output of filter 12 is the reconstructed image 24 in the form of 16×16 pixel tiled macroblocks 25 which have been reassembled and have had their boundaries filtered to restore the picture to the desired quality. The output of loop filter 12 is also used to reconstruct the reference frames. The intra prediction circuit 26 uses unfiltered previous decoded macroblocks to predict current macroblock data. The motion compensation circuit 28 uses out of order predicted (P) and bidirectional predicted (B) reference frames to reconstruct current macroblock data. Depending on the macroblock type (intra, inter) switch 30 position is set and the intra predicted macroblock 26 or the motion compensated macroblock 28 is added in summing circuit 22 to the residual macroblock data 20 to generate the current reconstructed macroblock. In the remainder of this particular embodiment the discussion will be focused on operation with the switch 30 in the intra prediction position.

Figure 2:
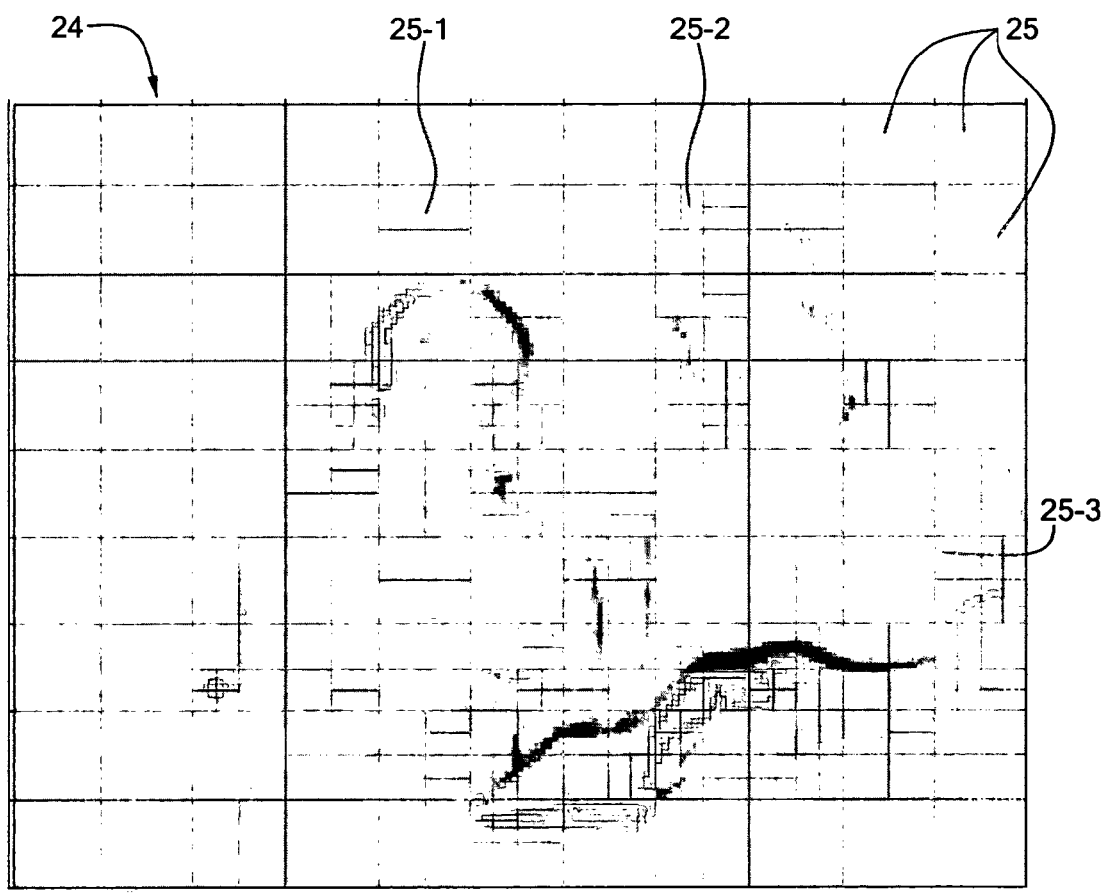
FIG. 2 is a schematic illustration of an image with macroblocks and sub-macroblocks superimposed.

An example of such an image, FIG. 2, shows that while many of the macroblocks 25, in the areas where there is not a lot of detail, are kept in single unitary 16×16 pixel macroblocks: in areas where the color, tonality and other features change, the macroblock may be broken into one or more sub-macroblocks, such as shown in macroblocks 25-1, 25-2 and 25-3, for example. The decision of whether to further sub-divide the macroblocks and how to further sub-divide them into sub-macroblocks is dictated by the encoder and the targeted bit rate. For example, in non-real time encoding applications such as DVD's the encoder can run all possible macroblock partitions and select the one that needs the minimum number of bits to encode that macroblock. On the other hand in real time encoding the encoder can't run all possible macroblock partitions but the encoder still seeks for the first (sub-optimal) macroblock partitions that satisfies the desired bit rate. A sampling of the various combinations is shown in FIG. 3A-G, where it can be seen: FIG. 3A shows a unitary macroblock of 16×16 pixels; FIG. 3B shows a macroblock composed of two 8×16 sub macroblocks; FIG. 3C shows an macroblock composed of two 16×8 sub macroblocks; FIG. 3D shows an macroblock composed of four 8×8 sub-macroblocks. The macroblock in FIG. 3E includes one 8×8 sub-macroblock, two 4×8 sub-macroblocks, four 4×4 sub-macroblocks and two 8×4 sub-macroblocks. In FIG. 3F, the macroblock includes one 8×16 sub-macroblock, two 4×8 sub-macroblocks and two 8×4 sub-macroblocks. And in FIG. 3G, the macroblock includes one 8×8 sub-macroblock, two 4×8 sub-macroblocks and one 16×8 sub-macroblock.

The actual coding and decoding of images using the macroblock and sub macroblock procedure involves both luma and chroma pixel information. This embodiment of the invention is explained only with respect to the luma information but applies equally as well to the chroma information.

Figure 4:
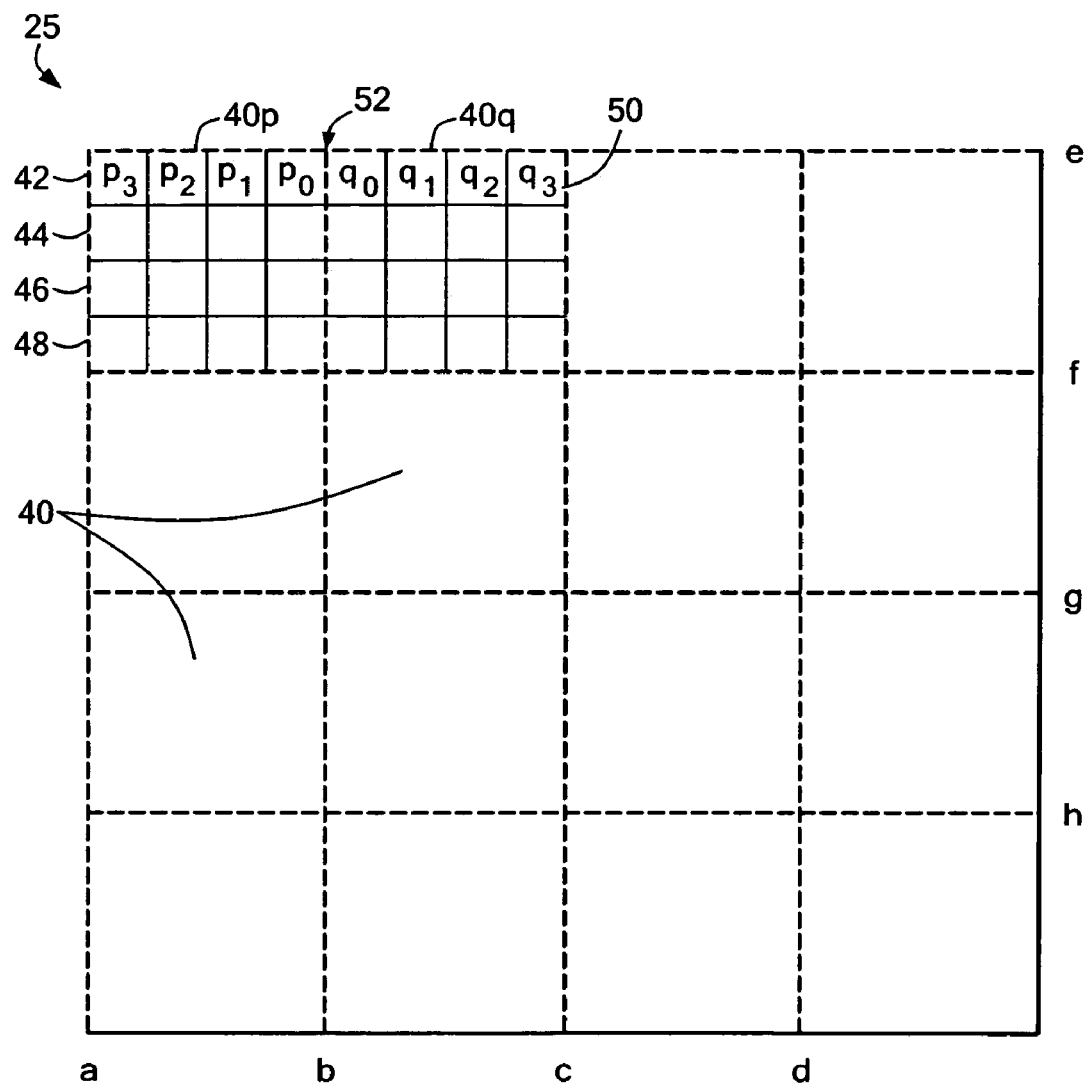
FIG. 4 is a schematic diagram of a 16×16 pixel macroblock with sixteen 4×4 pixel sub-macroblocks.

There is shown in FIG. 4, a typical macroblock 25 composed of 16 sub-macroblock 40 of 4×4 pixels or 16 pixel size. Sub-macroblock 40p includes four rows 42, 44, 46, and 48 of four pixels each. Only the first row 42 has the pixels named, $p_0, p_1, p_2, p_3$ the corresponding row 50 in sub-macroblock 40q has its four pixels identified as $q_0$, $q_1$, $q_2$, and $q_3$. By way of example assume that the border 52 between sub-macroblocks 40p and 40q is the border or boundary to be filtered in this example. In the edge level of adaptivity there are actually four filter "strengths" that can be used to filter the pixels on either side of that boundary in each row which are identified as indicated in the background as Bs=1, 2, 3, 4, Bs=0 means no filtering. Filter strength Bs=4 is the highest and it involves three out of the four pixels in each row $p_0$-$p_2$ and $q_0$-$q_2$. The lowest strength Bs=1, 2 and 3 effect only $p_0$, $p_1$, $q_0$ and $q_1$. The particular filter strength is governed by a content adaptive non-linear filtering scheme which is well defined by the coded specification. The filter is "stronger" at places where is likely to be significant blocking distortion, such as the boundary of an intra coded macroblock or a boundary between blocks that contain coded coefficients. For example, in the H.264 codec referred to in the Background, supra, in the sample level the filter strength ap/aq will be adapted by a function of the pixel gradient across block boundaries where ap is the pixel gradient across the p pixels and aq is the pixel gradient across q pixels. In other codecs, such as, Windows Media Video (.wmv) and MPEG-4 this is a function of boundary strength across block boundaries, where the filter strength will be adapted by comparing a running sum of "Ψ" function across the filtered edge against a threshold. Ψ function is defined as:

$$.\Psi = \begin{cases} 1 & \text{if } |Pixel_i - Pixel_{i+1}| < \text{threshold(where } i = 0 \text{ to filter length)} \\ 0 & \text{else.} \end{cases}$$

In this example the explanation will be with reference to the H.264 codec specification. In H.264 the pixel gradient function across block boundaries are defined as:

$$\text{Index Section} \begin{bmatrix} ap = |p_2 - p_0| < \text{Beta} & (1) \\ aq = |q_2 - q_0| < \text{Beta} & (2) \end{bmatrix}$$

Where Beta is a slice threshold set by H.264 encoder to adapt the amount of the reconstructed image filtering.

Assuming the filter at the boundary 52 is to be Bs=4, the processor that executes the loop filter or de-blocking filter has two choices: if ap equals 1 then the processor must carry out the three filters to update $P_0$, $P_1$ and $P_2$ as shown in equations (3), (4) and (5).

$$P_0 = (p_2 + 2p_1 + 2p_0 + 2q_0 + q_1)/8 \quad (3)$$

$$P_1 = (p_2 + p_1 + p_0 + q_0)/4 \quad (4)$$

$$P_2 = (2p_3 + 3p_2 + p_1 + p_0 + q_0)/8 \quad (5)$$

If ap is not 1, that is, if it equals 0 then only one filter need be carried out to update $P_0$ as shown in equation (6) and leave P1=p1 and P2=p2 (unchanged).

$$P_0 = (2p_1 + p_0 + q_1)/4 \quad (6)$$

An identical set of equations depending on aq=[0,1] would be used to process $Q_0$-$Q_3$ only in those equations the P's and Q's would be reversed and the equations would be being solved for $Q_0$, $Q_1$, $Q_2$ and equation (6) would be solved for $Q_0$.

Thus, if both filter powers were to be Bs=4 and if both pixel gradients ap and aq were equal to one the filtering for this row 42, FIG. 4, could be carried out by parallel processing in two identical compute units. However, this cannot be assured for while the $p_0$-$p_3$ filtering may by ap=1, the $q_0$-$q_3$ filtering may be aq=0. If they were both 1 then both compute units could in parallel move through operations (3), (4), and (5). Or if ap and aq both equal 0 the two compute units could in parallel move through operation (6). But if they are different one compute unit must perform operations as shown in (3), (4), and (5), while the other is simply doing the one operation of (6). That is, they are no longer parallel processing in the true sense. In one case the operations would involve (3), (4), and (5) and then jump over operation (6), whereas in the other case, operation (3), (4), and (5) would be jumped over to go directly to operation (6). These, if, else, or jump, or non-sequential type of instructions are not workable in multiple compute unit processors with deep pipeline stages. The jumps break the flow and require many cycles to clear the pipeline of old instructions and fill it up with the new instructions.

This invention results from the realization that even though different operations are to be performed, parallel processing can take place in two or more compute units by converting the non sequential instructions, such as shown in (3), (4), (5) and (6) to a more generalized generic instruction that carries both operations within it but calls up local coefficients stored in each compute unit to null out terms that are extraneous or not required in the particular operation called for by that local compute unit. For example, the non-sequential instructions represented by the equations (3) and (6) for $P_0$ can be generalized as follows. For ap=1 equation (3) can be rewritten as $$P_0 = \frac{p2}{8} + \frac{2p1}{8} + \frac{2p0}{8} + \frac{2q0}{8} + \frac{q1}{8} \quad (7)$$

and for ap=0 equation (6) can be rewritten as $$P_0 = \frac{2p1}{4} + \frac{p0}{4} + \frac{q1}{4} \quad (8)$$

Equation (7) can then be generalized to:

$$\frac{2p0}{8} + \frac{2p1}{8} + \frac{p2}{8} + \frac{2q0}{8} + \frac{q1}{8} \quad (9)$$

and equation (8) can be generalized to:

$$\frac{p0}{4} + \frac{2p1}{4} + \dots \frac{q1}{4} \quad (10)$$

and it can be seen that equation (9) and equation (10) are in the same form except that equation (10) for $P_0$ and ap=0 has no $p_2$ or $q_0$ term. The generic instruction stream can be represented as:

$$p_0 * K_0 + p_1 * K_1 + p_2 * K_2 + q_0 * K_3 + q_1 * K_4 \quad (1)$$

where all the terms in both equations (9) and (10) are represented $p_0$, $p_1$, $p_2$, $q_0$, $q_1$, but with accompanying coefficients $K_0$-$K_4$. The new generic instruction stream will have two parts, an index section, which represents the value ap or aq depending upon which pixel is being worked on, as shown in equations (1) and (2) respectively, and the compute section as shown in equation (11). When the compute section arrives at a compute unit along with the index section, the compute section is directed to look in its storage for the set of parameters, coefficients K, which apply to its particular condition indicated in the index section ap=1 or ap=0.

Figure 5:
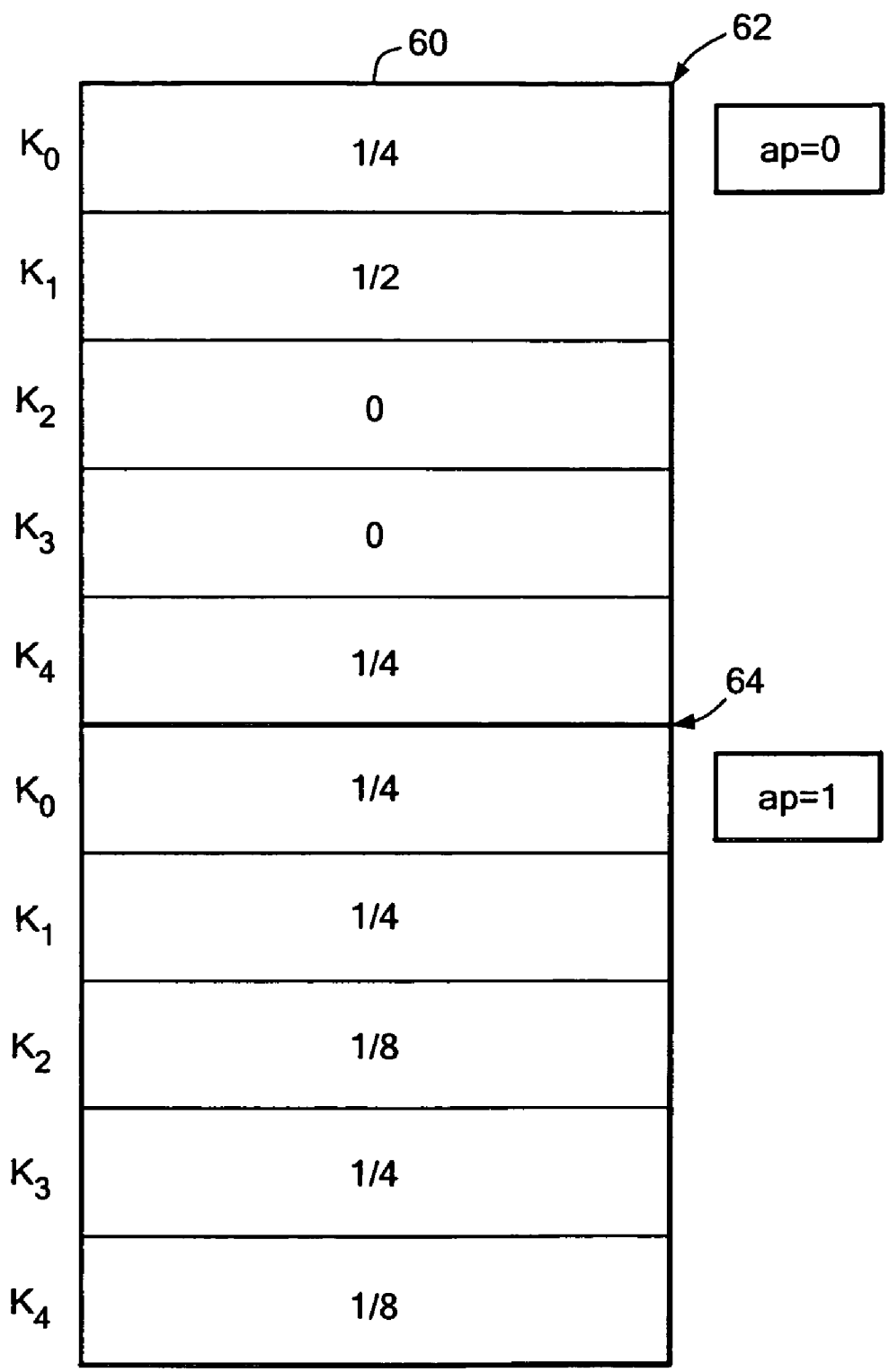
FIG. 5 is a table of coefficients for ap=1 and ap=0 for Bs=4.

As shown in FIG. 5, this storage can consist of a table 60 having two parts, one part 62 for ap=0 the second part 64 for ap=1. When the compute section arrives accompanied by an index section where ap equals 1 equation (11) will have the coefficients $K_0$-$K_4$ taken from table 64. By applying these coefficients equation (9) is satisfied. However, in compute units that receive compute section equation (11) accompanied by an index section with ap=0, the coefficients $K_0$-$K_4$ from table 62 will be applied. When they are applied it can be seen that the coefficients $K_2$ and $K_3$ are 0. Those 0's null out the $p_2$ and $q_0$ terms resulting in the operation of equation (10).

This is performed again for $P_1$, equation (4) and $P_2$, equation (5). Since there are not comparable equations for the situation where ap=0, tables for $p_1$ and $p_2$ will contain, in the ap=0 condition, coefficients which will simply leave $p_1$ as $p_1$ and $p_2$ as $p_2$, but that requires an instruction operation which will keep the compute units in corresponding parallel processing. This can be accomplished in a processor 70, FIG. 6, having two compute units 72 and 74. Each compute unit includes the same parts. Compute unit 72 includes a multiplier 76 and an accumulator 78, while compute unit 74 includes a multiplier 80 and accumulator 82. Each compute unit 72, 74 also includes a storage unit. Compute unit 72 which will deliver the filtered value of $P_0$ will contain the p data in storage unit 90, while compute unit 74 which will compute the filtered value $Q_0$ will contain the q data in storage unit 92. Storages 90 and 92 will include the actual pixel values that occur in the sub-macroblock of FIG. 4, for example. Likewise the coefficients for ap=0 will be stored in the storage unit 94 in compute unit 72 and the coefficients for aq=1 will be in the storage unit 96 in compute unit 74. Note though storage units 90 and 92 hare grouped and storage units 94 and 96 are grouped for ease of illustration storage units 90 and 94 would more likely be contained in compute unit 72 and storage units 92 and 96 would be contained in compute unit 74.

Figure 6:
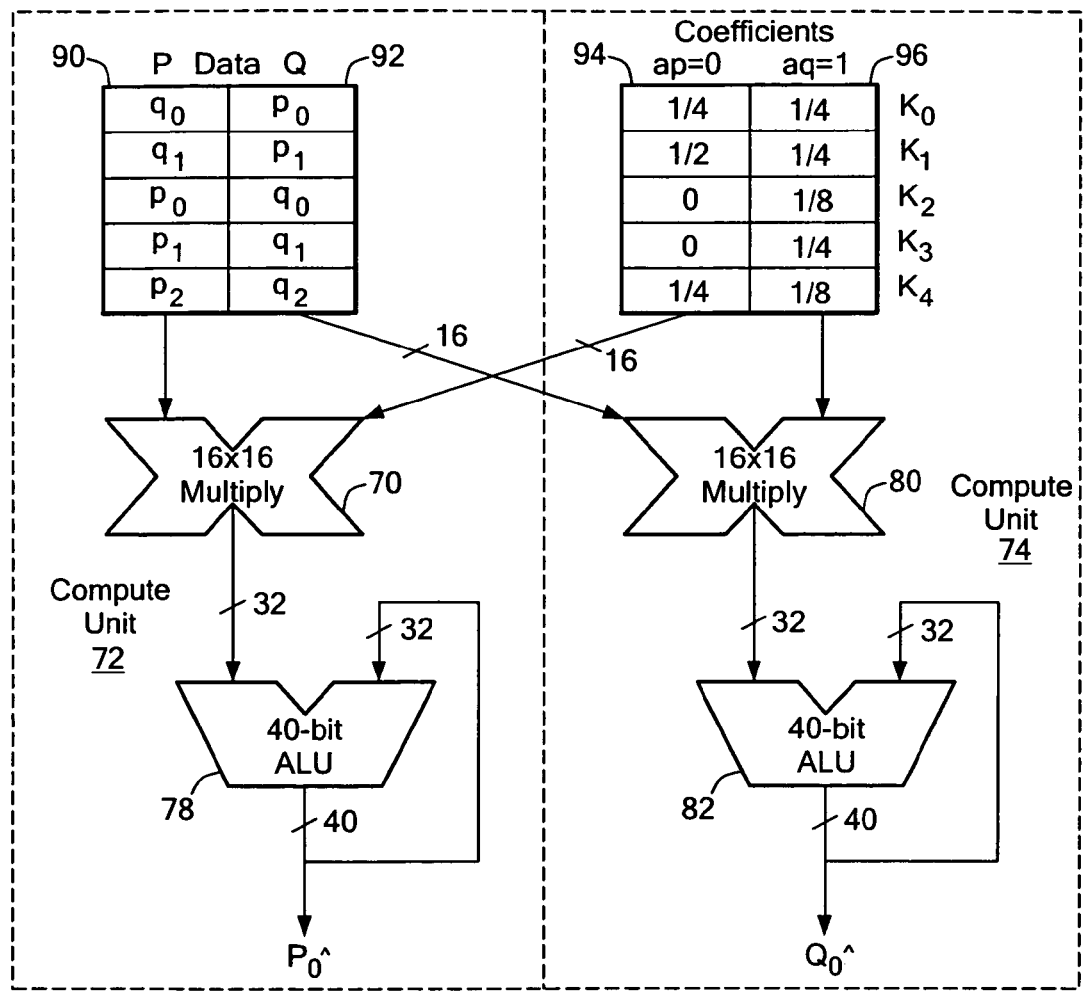
FIG. 6 is a schematic block diagram of a dual (two) compute unit processor which can be used to parallel process a non-linear instruction stream in accordance with the method of this invention.

As compute units 72, 74, then, are driven in parallel by the generic instruction stream equation (11), each will perform the necessary operations to obtain $P_0$ and $Q_0$ and since in this particular example, in FIG. 6, the index section accompanying the generic instruction stream indicates that ap=0 the coefficients in storage unit 94 will include 0's for $K_2$ and $K_3$, so that equations (8) and (10) are carried out, whereas in compute unit 74 where aq=1 the index section will have delivered an aq=1, so that when the coefficients in storage unit 96 are applied to the compute section equations (7) and (9) will be carried out.

Figure 7:
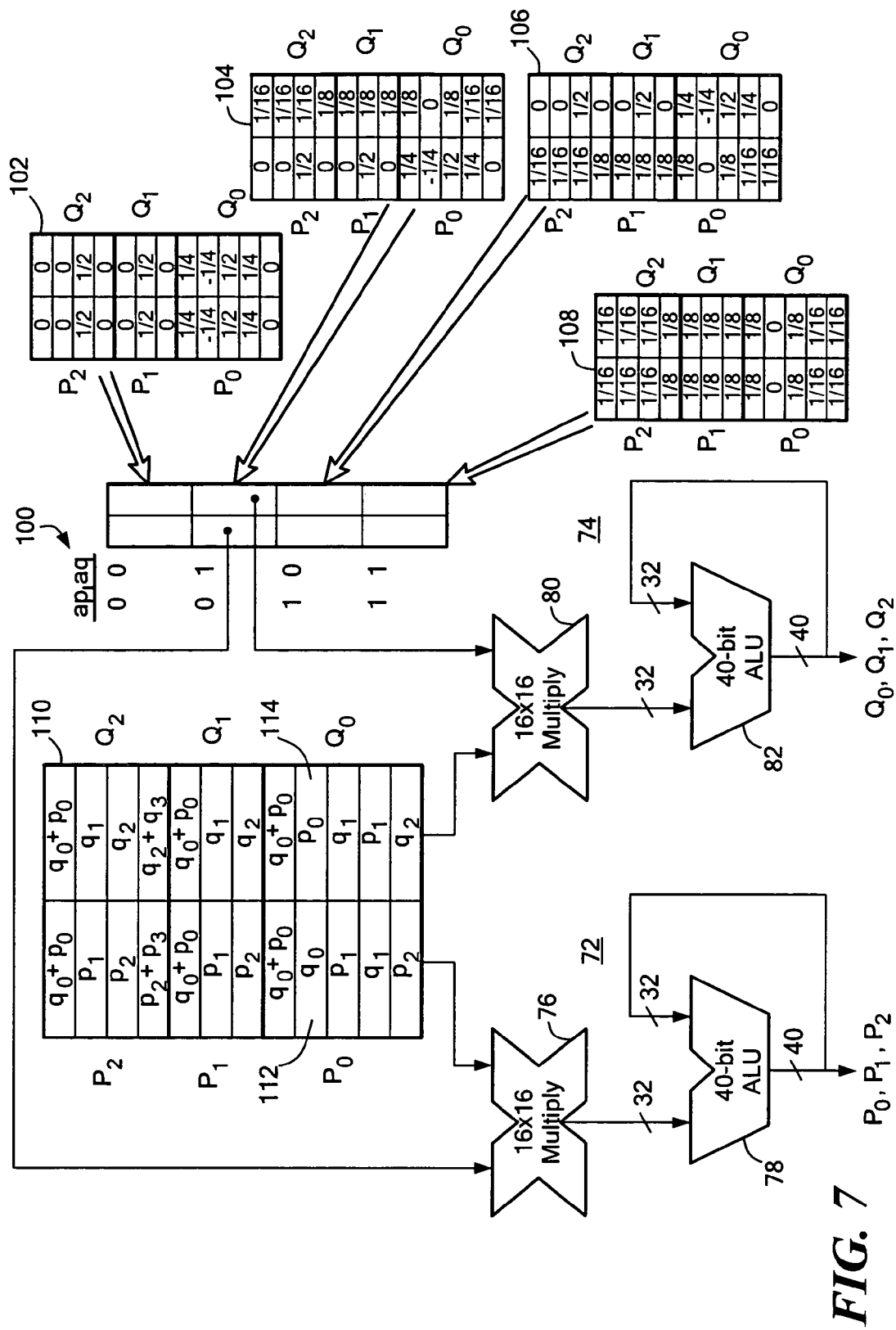
FIG. 7 is a view similar to FIG. 6 with all the storage units for local data and parameter sets (coefficients) for all values of ap and aq to calculate $P_0$, $P_1$, $P_2$, $Q_0$, $Q_1$, and $Q_2$.

Understanding the operation of FIG. 6, it can be seen that data tables such as data tables 90, 92 and coefficient tables such as 94, 96 can be created and stored for all four possible conditions of ap and aq as shown in FIG. 7. There, for the four conditions of ap and aq 0 0, 0 1, 1 0, 1 1 shown at 100, there are the corresponding sets of storages 102, 104, 106, and 108. Within each storage there are sets of parameters and coefficients for each of the filter values to be obtained $P_0$, $P_1$, $P_2$, $Q_0$, $Q_1$, $Q_2$. Further the pixel value data $p_0 \ldots p_2$, $q_0 \ldots q_2$ can be stored so that not just the filtered values $P_0$ and $Q_0$ can be parallel processed but the parallel processing can also be extended to obtain $P_1$, $Q_1$, $P_2$, and $Q_2$, as shown in storage 110. Note that for purposes of clarity all of the data storages 110 are shown as a single unit whereas they would be dispersed to the proper one of compute units 72 and 74. So, too, with respect to the parameter set storages 102, 104, 106, and 108. That is, although shown here as common storages they are actually in the local compute unit to which they pertain.

Note two changes that have been made in the representations of storages 102, 104, 106, and 108 and with respect to storage 110. With respect to storage 110 note that the values $q_0$ plus $p_0$ have been combined as one data storage to eliminate a multiple operation. That is, this is just a shortcut adding $q_0$ and $p_0$ and then multiplying both at once to save an operation. However, to cancel this out an extra term is added in positions 112 and 114. With respect to storage's 102, 104, 106, and 108 it happens that in conventional DSPs 2'C fractional math is used to represent numbers in the (+1, −1] range. In 2"C math an accurate +1 cannot be represented, only a +1-LSB. One of the ways to get an accurate one using 2'C fractional math is to multiply a ½ by 2. Therefore, all of these tables 102, 104, 106, 110 reflect the coefficients reduced by one half: the output is then multiplied by two by a simple, single, one place, left shift. This is not a necessary part of the invention, but only an improvement or shortcut that makes the operation even a little bit faster.

Thus by using the approach of the generalized generic instruction stream according to this invention it is possible to approach the speed-up factor of n in the processing time, where n is the number of compute units, with the small exception that there are a few extra steps done here that normally needn't be done, but that is a small price to pay for the n times increase in speed obtained by the ability, finally, to parallel process non-linear instruction streams.

Figure 8:
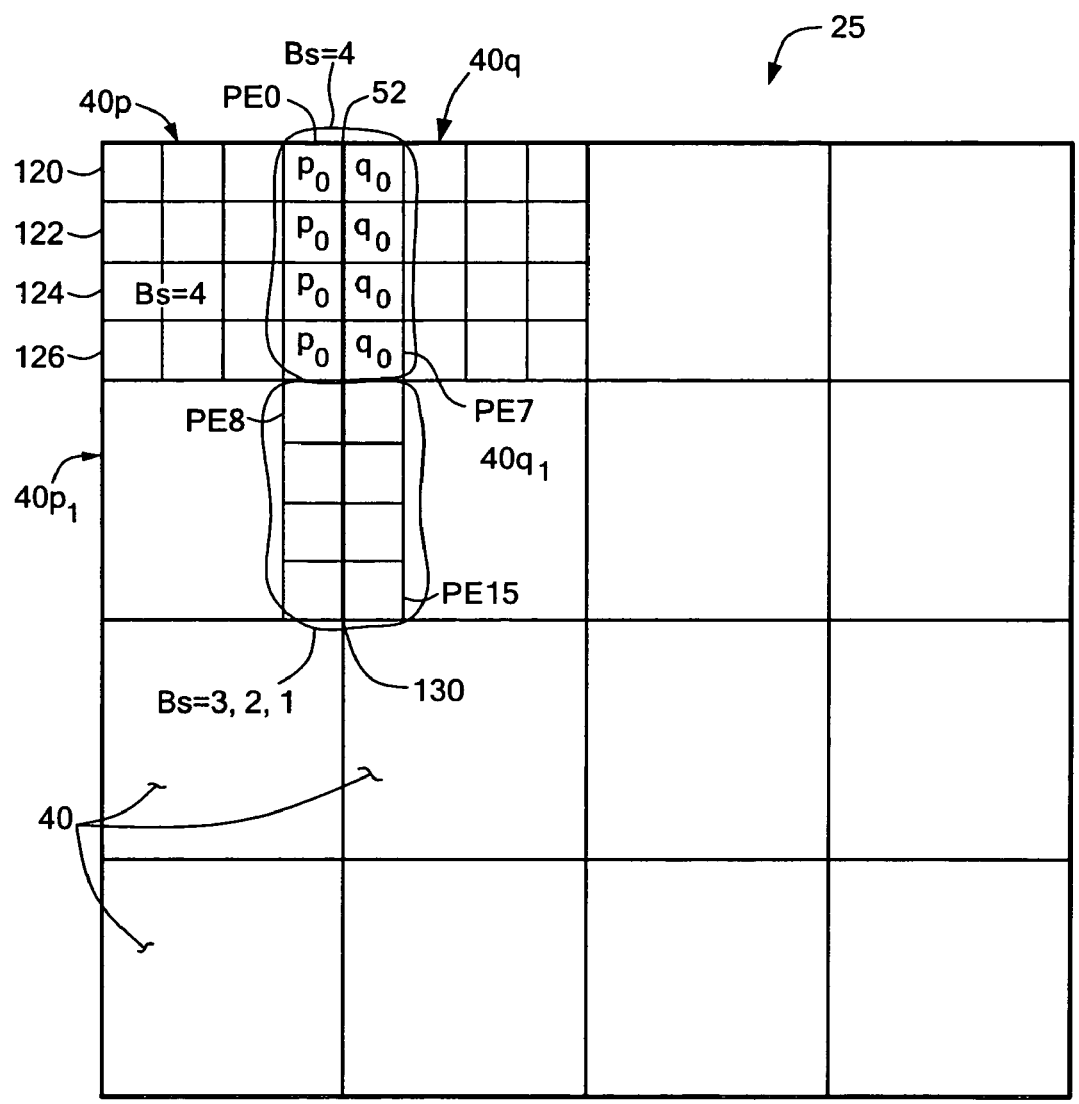
FIG. 8 is a view similar to FIG. 4 illustrating a second border or boundary to be filtered between two more sub-macroblocks.

While thus far the method has been demonstrated with respect to only two compute units the invention is applicable and wholly desirable for use with processors having many more than just two/dual compute units. For example, as shown in FIG. 8, using a processor with eight compute units one could not only process the filtering of P0 and Q0 for the first row 120 but could do so for all four rows 120, 122, 124, and 126 in both sub-macroblock 40*p* and sub-macroblock 40*q*. In many instances the SIMD processor may contain many more than eight compute units, for example, 16, 32 or more operated, for example, in clusters of eight where each cluster handles the same boundary strength parameter (Bs). The local data may include image pixels and the index section may be a linear function of the pixel gradient or boundary strength across block boundaries and the boundary strength parameter Bs. So, now, not just boundary 52 between sub-macroblock 40*p* and 40*q* can be processed but one might also process boundary 130 between sub-macroblocks 40*p*$_1$ and 40*q*$_1$.

However, this presents a new problem because while the filter strength parameter Bs is the same for each of the rows 120, 122, 124, 126 involving border 52 between sub-macroblocks 40*p* and 40*q*, border 130 between sub-macroblocks 40*p*$_1$ and 40*q*$_1$ could have an entirely different filter strength parameter. For example, Bs for border 130 could equal 3, 2, or 1. In that case, one would have to have four tables such as 102, 104, 106, 108 in FIG. 7 corresponding to the four possible conditions of ap and aq for each of the filter strength parameter Bs=1, 2, 3, and 4. That is, there now would be 16 storages required for the sets of parameters or coefficients as indicated in FIG. 9, where for each of filter strengths Bs=1, 2, 3, and 4 there are four tables of sets of parameters to support the four possible combination of ap and aq, like tables 102-108, FIG. 7, where in FIG. 9 they are identified as 102*a*-108*a*, 102*b*-108*b*, 102*c*-108*c*, 102*d*-108*d*.

After using equations (1) and (2) to calculate the local ap and aq, for filters Bs=1-3, one has to calculate the value diff, $$\text{diff} = \text{clip}(-c_0, c_0, ((q_0 - p_0) * 4 + (p_1 - q_1) + 4)/8) \tag{12}$$

where the clipping occurs from $-c_0$ to $+c_0$ and $$P_0 = \text{clip}(0, 255, p_0 + \text{diff}) \tag{13}$$

where the clipping occurs from 0 to 255 which clips the result to the full range of the system pixel value. In these filters Bs=1-3, if ap is a 1 then $$P_1 = p_1 + \text{Clip}(-C_0, C_0, (p_2 + ((p_0 + q_0 + 1) >> 1) - (p_1 << 1)) >> 1) \tag{14}$$

or else (ap=0) $P_1$ is simply equal to $p_1$:

$$P_1 = p_1 \tag{15}$$

For luma, $c_0$, in equations (12) and (14) is calculated as:

$$c_0 = C_0 + ap + aq \tag{16}$$

Figure 11:
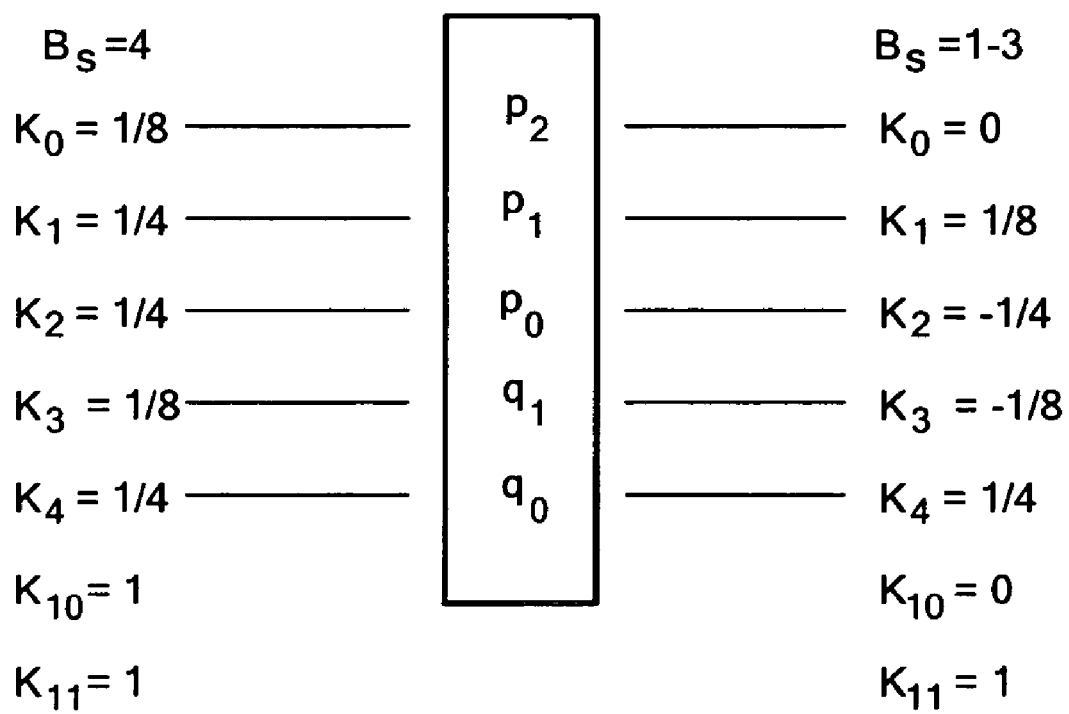
FIG. 11 is a table for sets of parameters (coefficients) for the generic equation to calculate p0 @ap=1 for Bs=4 and Bs=1-3.

(For chroma $c_0$ is calculated at $C_0+1$.) The value of $C_0$ is obtained from the table shown in FIG. 10. The diff equation (12) before clipping $$\text{diff} = (q_0 - p_0)\frac{1}{2} + (p_1 - q_1)\frac{1}{8} \quad (17)$$

can be expanded as $$\text{diff} = \frac{4q0}{8} - \frac{4p0}{8} + \frac{p1}{8} - \frac{q1}{8} \quad (18)$$

which expresses the conditions for Bs=1-3. Since there is no similar expression or operation for Bs=4 the operation, for example, of equation (9) or (10) becomes a parallel operation to "diff". This is accomplished as explained previously by using the non-linear instructions (12) and (13) to derive the generic instruction stream equations (19) and (23). Then substituting in (19) the values $K_0$-$K_4$ for Bs=4 to solve equation (9) or (10) and the value for $K_0$-$K_4$ for Bs 1-3 to solve equation (18) all as shown in the table of FIG. 11. The generic instruction stream equation (19) can thus be made to serve equation (9), (10) and equation (18). Following in the non linear case (12) for filter strength of Bs 1-3 this diff is also required to be clipped form $-c_0$ to $+c_0$, $$\text{diff} = p_2*K_0 + p_1*K_1 + p_0*K_2 + q_1*K_3 + q_0*K_4 \quad (19)$$

$$\text{clip} = c_0 = C_0 + ap + aq \quad (20)$$

but, for the linear case (9), (10) for filter strength of Bs=4 no clipping is required, so for that operation clipping is set to 0 and 255 which is the full range of the system pixel value (no clipping). Regardless of Bs value a clipping operation must occur in order to keep the parallel processing in step. The next step in dealing with Bs=1-3 is to calculate $P_0$, $$P_0 = p_0 + \text{diffp} \quad (21)$$

after which the outcome is clipped from 0 to 255 to keep the result in bounds. Departing from the published specs. as taught by this invention, in dealing with Bs=4, $P_0$ is calculated as $$P_0 = \text{diffp} \quad (22)$$

using equation (9) or (10) as diff. Once again it can be seen that equation (21) and (22) are the same form except that equation (22) for Bs=4 is not adding $p_0$. The generic instruction-stream as taught by this invention can be represented as (23)

$$P_0 = p_0*K10 + \text{diffp}*K11 \quad (23)$$

and the parallel processing is maintained by making both K10 and K11 equal to 1 in equation (21) but in equation (22) these local parameters will be changed to K10 equals 0 and K11 equals 1. And the contribution of the $p_0$ term will be removed. Clipping will then occur here as well between 0 and 255 to complete the operation. This procedure can be applied with respect to $P_1$-$P_3$ and the remaining $Q_1$-$Q_3$.

It should be understood that the approach of using a generalized instruction stream according to this invention applies for a cluster of compute units all operating with the same Bs strength as explained with respect to equations (1)-(11) and also applies for a plurality of clusters of compute units each cluster operating with Bs strengths that may differ. The problem in the latter case is somewhat different than in the former.

In the former all the terms are linear: add, subtract, multiple, divide $P_{0-3}$, $q_{0-3}$, but in the latter there are non-linear terms as explained with reference to equations (12)-(23): there are two stages of clipping. In equation (12) "diff" involves clipping from $-c_0$ to $+c_0$ and in equation (13), after adding diff to p0 there is another clipping form 0-255 to keep the result in bounds. To generalize in this case for Bs=1-3 "diff" in equation (13) is defined as in equation (12), but for Bs=4 "diff" is defined as in equation (3) or (6), for example, (or (4) or (5)). Then for Bs=1-3 "diff" in equation (13) is equal to the "diff" of equation (12), whereas for Bs=4 "diff" in equation (13) is equal to $P_0$ in equation (3) or (6) and $p_0$ is nulled or zeroed in order to generalize the instruction. This is shown in the Chart I below.

Chart I

| Bs = 1–3 (non-linear) | Bs = 4 (linear) |
|---|---|
| diff = clip($-c_0$, $c_0$, (($q_0 - p_0$)*4 + ($p_1 - q_1$) + 4)/8) (12) | diff = $P_0$ = ($p_2 + 2p_1 + 2p_0 + 2q_0 + q_1$)/8 (3) for ap == 1 |
| | or |
| | diff = $P_0$ = ($2p_1 + p_0 + q_1$)/4 (6) for ap == 0 |
| $P_0$ = clip (0, 255, ($p_0$ + diff)) | $P_0$ = clip(0, 255, (diff)) |

Figure 12:
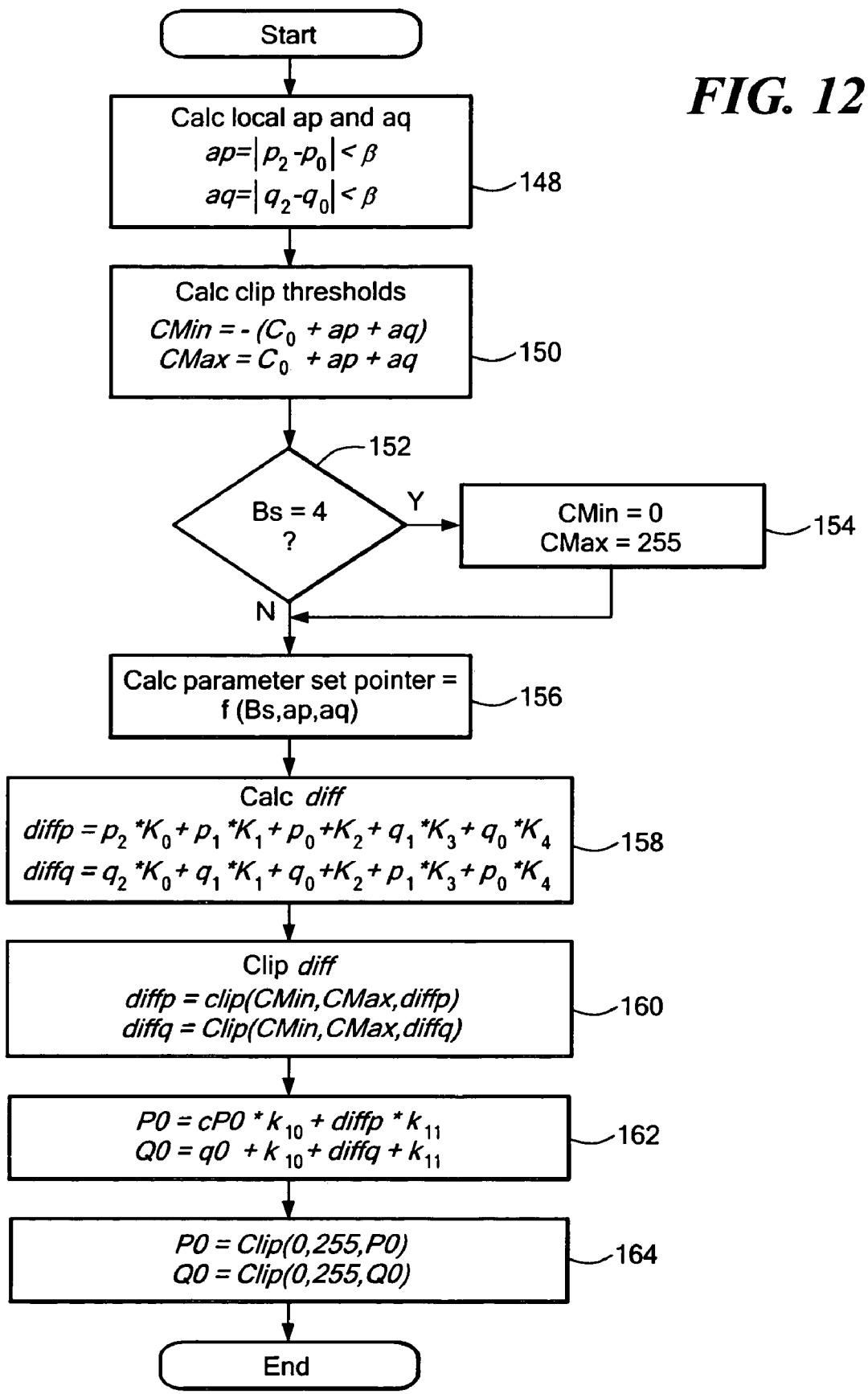
FIG. 12 is a flow chart illustrating the method of this invention.

In operation the action actually begins with the calculation, step 148, FIG. 12, the pixel gradient across the block boundary ap and aq, followed by the calculation of the clip value, step 150, of CMin=$-c_0$ and CMax=$c_0$ where $c_0$=$C_0$+ap+aq. Then inquiry is made in step 152 as to whether the strength of the filter is 4. If it is, then in step 154 the clipping values are changed to be between CMin=0 and CMax=255 (no clipping). Otherwise the clip values are left unchanged ($-c_0$,$+c_0$). In step 156 based on the local strength parameter (Bs), ap and aq the index section selects the local set of parameters and coefficients pointer which will be used by the following steps to adapt the generic instruction stream to the local solution. The process then turns to the compute section in step 158 where the left and right boundary diff's are calculated in case of Bs=1, 2, 3, or Q0 and P0 if Bs=4. In step 160 diff's are clipped between ($-c_0$,$+c_0$) in case of Bs=1, 2, 3, or between (0,255) if Bs=4. Then in step 162 the parameters K10 and K11 are applied. K10 and K11 are equal to 1 in case of Bs=1, 2, 3 (for filter strength below 4) to adapt equations 162 to Q0=q0+diffq and P0=p0+diffp. K10 and K11 are supplied as 0 and 1, respectively, if Bs=4 (filter strength is 4) to adapt equations 162 to Q0=Q0 and P0=P0. The final Q0 and P0 clipping then occurs in step 164. This is repeated for $Q_1$ and $P_1$ and so forth.

Figure 13:
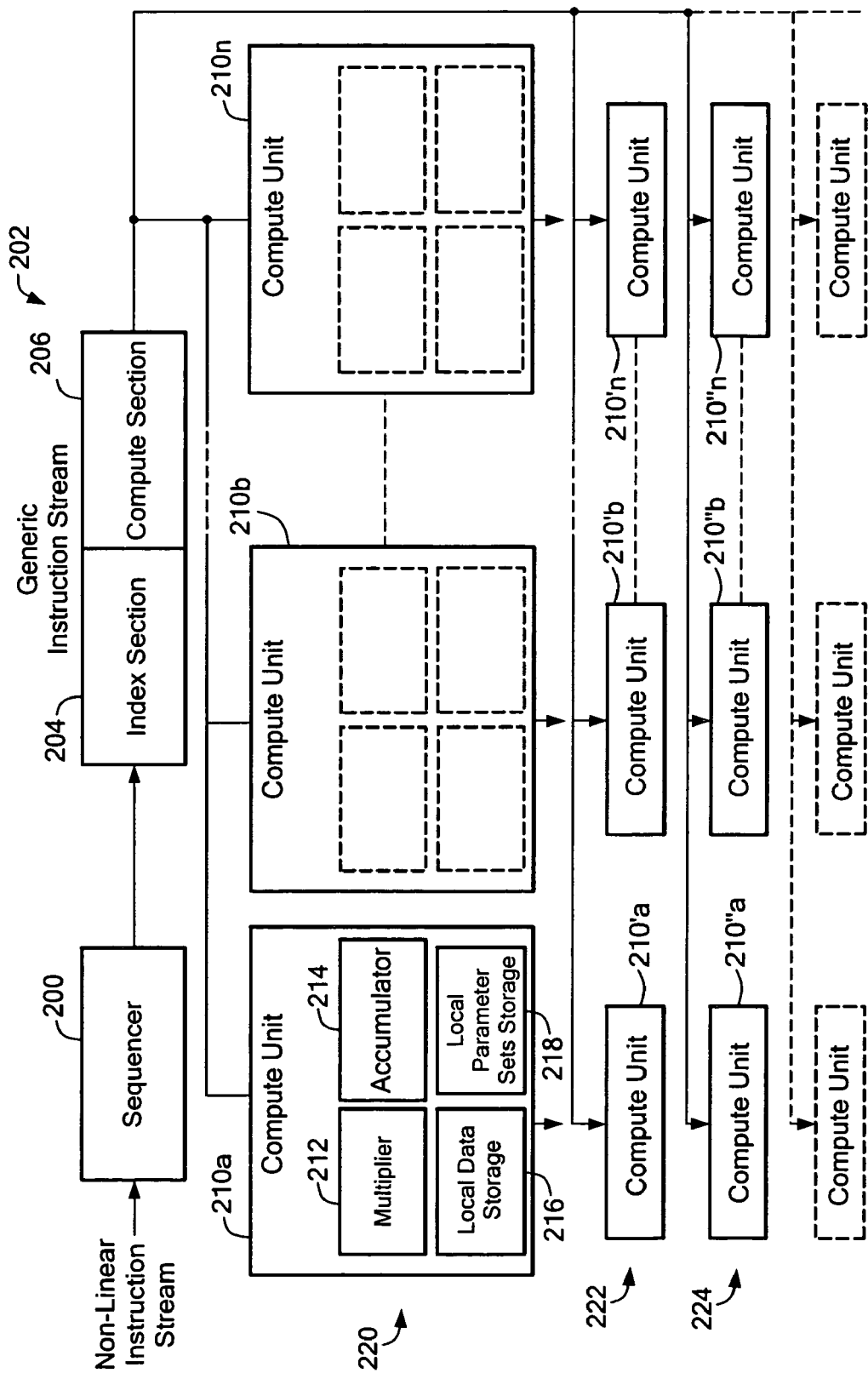
FIG. 13 is a block diagram of a processor with multiple compute units for accelerating processing of a non-sequential instruction stream.

One system for implementing this method includes a sequencer 200, FIG. 13, for receiving non linear instruction streams and producing generic instructions streams 202 including the index section 204 and the compute section 206. This generic instruction stream is submitted to all of the compute units 210*a*, 210*b*,-210*n*, for parallel processing. Each of the compute units 210*a-n* includes a multiplier 212 accumulator 214 and a storage medium for local data storage 216 and local parameter set storage 218. The system of FIG. 13 has a plurality of clusters 220, 222, 224 . . . of compute units each including a number of compute units 210*a*-210*n*, 210'*a*-210'*n*, 210"*a*-210"*n* . . . each of which clusters may operate at a different Bs strength.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A method of accelerating processing of a non-sequential instruction stream on a processor with multiple compute units comprising:
   receiving by at least one compute unit, a generic instruction stream derived from a sequence of instructions, said generic instruction stream including an index section and a compute section;
   executing, in said at least one compute unit, an instruction in said index section using localized data stored in each compute unit to calculate a value;
   selecting, in said at least one compute unit, one of a plurality of stored local parameter sets based on the calculated value; and
   in said at least one compute unit, executing a function specified in the compute section using the selected parameter set and the localized data to produce the compute unit's localized solution to the generic instruction stream.

2. The method of claim 1 further comprising performing a nulling operation to selectively remove unnecessary terms from the generic instruction stream to adapt the generic instruction stream to the localized solution.

3. The method of claim 1 in which each said compute unit includes at least a multiplier and an accumulator.

4. The method of claim 3 in which each said compute unit further includes a local storage.

5. The method of claim 4 in which each said local storage includes a data storage and a parameter storage.

6. The method of claim 1 in which said parameters include filter coefficients.

7. The method of claim 1 in which said localized data includes image pixels, and said index section is a function of the pixel gradient across block boundaries.

8. The method of claim 1 in which said localized data includes image pixels, and said index section is a function of boundary strength across block boundaries.

9. The method of claim 1 in which said compute section includes clipping operation instructions.

10. The method of claim 9 further comprising selectively nulling clipping operations of the associated compute unit to adapt the generic instruction stream to the localized solution.

11. The method of claim 1 in which said processor with multiple compute units is a single instruction multiple data (SIMD) processor.

12. The method of claim 1 in which said processor with multiple compute units is a loop filter.

13. The method of claim 1 in which said processor with multiple compute units is a video de-blocking filter.

14. The method of claim 13 in which said localized data includes image pixels and said index section is a linear function of the pixel gradient across block boundaries and the boundary strength parameter.

15. The method of claim 13 in which said localized data includes image pixels and said index section is a function of boundary strength across block boundaries and the boundary strength parameter.

16. The method of claim 13 in which said parameter sets include at least two filter coefficients sets.

17. The method of claim 13 in which the multiple compute units are grouped into clusters in which all compute units in a cluster are solving the same problem for the same strength parameter and different clusters solve for different strength parameters.

18. The method of claim 17 in which the compute section of each said generic instruction stream includes a generic solution for all compute units in all clusters to keep all compute units in step.

19. The method of claim 17 in which the compute section of each said generic instruction stream includes a generic solution of all different strength parameters for all compute units in all clusters to keep all compute units in step.

20. The method of claim 17 in which the compute section of each said generic instruction stream includes a generic non-linear solution of all different strength parameters for all compute units in all clusters to keep all compute units in step.

21. The method of claim 20 further comprising selectively nulling clipping operations of the associated compute unit to adapt the non-linear generic solution to a linear solution.

22. A method of accelerating processing of a non-sequential instruction stream on a processor with multiple compute units comprising:
   generating a generic instruction stream from a sequence of instructions; said generic instruction stream including an index section and a compute section;
   receiving by at least one compute unit said generic instruction stream with index section and compute section;
   executing, in said at least one compute unit, an instruction in said index section using localized data stored in the compute unit to calculate a value;
   selecting, in said at least one compute unit, one of a plurality of stored local parameter sets based on the calculated value; and
   in said at least one compute unit, executing a function specified in the compute section using the selected parameter set and the localized data to produce the compute unit's localized solution to the generic instruction stream.

23. A processor with multiple compute units for accelerating processing of a non-sequential instruction stream comprising:
   a sequencer circuit for deriving from a sequence of instructions a generic instruction stream including an index section and a compute section; and
   a plurality of compute units each including a local data storage having local data and local parameter sets storage having a plurality of local parameter sets;
   each said compute unit executing an instruction in said index section using local data to calculate a value, selecting one of said local parameter sets based on the calculated value, and applying the selected parameter set to said local data to execute a function represented by the compute section to produce each compute unit's localized solution to the generic instruction stream.

24. The processor of claim 23 in which each said compute unit includes a multiplier and an accumulator.

25. The processor of claim 23 in which each said set of parameters includes nulling values to selectively remove unnecessary terms of the generic instruction to adapt the generic instruction to the localized solution.

26. The processor of claim 23 in which each said sets of parameters include filter coefficients.

27. The processor of claim 23 in which each said local data includes image pixels and said index section is a function of the pixel gradient across block boundaries.

28. The processor of claim 23 in which each said local data includes image pixels and said index section is a function of boundary strength across block boundaries.

29. The processor of claim 23 in which each said compute section includes clipping operation instructions.

30. The processor of claim 29 in which each said parameter set includes nulling values to selectively null clipping operations of the associated compute unit to adapt the generic instruction stream to the local solution.

31. The processor of claim 23 which includes a single instruction multiple data (SIMD) processor.

32. The processor of claim 23 which includes a loop filter.

33. The processor of claim 23 which includes video de-blocking filter.

* * * * *